(12) United States Patent
Iwasaki

(10) Patent No.: US 9,240,998 B2
(45) Date of Patent: Jan. 19, 2016

(54) MANAGEMENT APPARATUS AND CONTROL METHOD OF MANAGEMENT APPARATUS

(71) Applicant: SQUARE ENIX HOLDINGS CO., LTD., Tokyo (JP)

(72) Inventor: Tetsuji Iwasaki, Montreal (CA)

(73) Assignee: SHINRA TECHNOLOGIES, INC., New York, NY (US)

( * ) Notice: Subject to any disclaimer, the term of this patent is extended or adjusted under 35 U.S.C. 154(b) by 0 days.

(21) Appl. No.: 14/356,475

(22) PCT Filed: Oct. 31, 2012

(86) PCT No.: PCT/JP2012/078765
§ 371 (c)(1),
(2) Date: May 6, 2014

(87) PCT Pub. No.: WO2013/069652
PCT Pub. Date: May 16, 2013

(65) Prior Publication Data
US 2014/0310795 A1    Oct. 16, 2014

Related U.S. Application Data

(60) Provisional application No. 61/556,425, filed on Nov. 7, 2011.

(30) Foreign Application Priority Data

Jan. 26, 2012   (JP) .................. 2012-014539

(51) Int. Cl.
 *H04L 29/06* (2006.01)
 *H04L 29/08* (2006.01)
 *G06F 9/50* (2006.01)

(52) U.S. Cl.
 CPC ............. *H04L 63/10* (2013.01); *G06F 9/5055* (2013.01); *H04L 63/0281* (2013.01); *H04L 67/1008* (2013.01)

(58) Field of Classification Search
 CPC ... G06F 9/5055; H04L 63/0281; H04L 63/10; H04L 67/10; H04L 67/1004; H04L 67/101; H04L 67/1008; H04L 67/1025
 USPC .......................................................... 726/12
 See application file for complete search history.

(56) References Cited

U.S. PATENT DOCUMENTS

| 5,249,290 A | 9/1993 | Heizer |
| 7,373,644 B2 | 5/2008 | Aborn |

(Continued)

FOREIGN PATENT DOCUMENTS

| JP | 2002-163241 | 6/2002 |
| JP | 2002-259354 | 9/2002 |

(Continued)

OTHER PUBLICATIONS

International Search Report (ISR) in International Patent Application No. PCT/JP2012/078765, dated Dec. 11, 2012.

(Continued)

*Primary Examiner* — Yogesh Paliwal
(74) *Attorney, Agent, or Firm* — Greenblum & Bernstein, P.L.C.

(57) ABSTRACT

When a plurality of user terminals request a plurality of contents, the numbers of user terminals which request the content are managed. For each of the plurality of contents, the number of content servers which provide that content is decided using the managed numbers. For each of the plurality of contents, the content is installed in content servers as many as the number decided in association with that content, and user terminals which request the content are permitted to access the content servers which provide the content.

15 Claims, 3 Drawing Sheets

(56) References Cited

U.S. PATENT DOCUMENTS

| | | |
|---|---|---|
| 2001/0042110 A1* | 11/2001 | Furusawa et al. ............. 709/219 |
| 2003/0065703 A1 | 4/2003 | Aborn |
| 2005/0038890 A1 | 2/2005 | Masuda et al. |
| 2008/0162700 A1 | 7/2008 | Aborn |
| 2009/0254952 A1* | 10/2009 | Sridhar et al. ................. 725/92 |
| 2011/0202596 A1 | 8/2011 | Gokurakuji |

FOREIGN PATENT DOCUMENTS

| | | |
|---|---|---|
| JP | 2005-031987 | 2/2005 |
| JP | 2005-092862 | 4/2005 |
| JP | 2006-277278 | 10/2006 |
| JP | 2006-331447 | 12/2006 |

OTHER PUBLICATIONS

Extended European Search Report (EESR) issued by European Patent Office (EPO) in European Patent Application No. 12847407.9, dated Sep. 21, 2015.

* cited by examiner

FIG. 4

| CONTENT A | 50 |
|---|---|
| CONTENT B | 80 |
| CONTENT C | 10 |

FIG. 5

| CONTENT A | 50 |
|---|---|
| CONTENT B | 10 |
| CONTENT C | 60 |

MANAGEMENT APPARATUS AND CONTROL METHOD OF MANAGEMENT APPARATUS

CLAIM FOR PRIORITY

This application is a U.S. National Stage of PCT/JP2012/078765 filed on Oct. 31, 2012, and claims the priority benefit of U.S. provisional application 61/556,425, filed Nov. 7, 2011, and Japanese application 2012-014539 filed on Jan. 26, 2012, the contents of which is expressly incorporated by reference herein in its entirety.

TECHNICAL FIELD

The present invention relates to a communication control technique.

BACKGROUND ART

In a network service which provides a plurality of contents, accesses are concentrated on hot contents. In a system used for the network service, content servers of one data center store contents, which are provided by a plurality of companies and individuals, together.

For this reason, the system is required to attain smooth load balancing of the data center which can avoid access concentration on the contents and robust security performance between contents in correspondence with the load balancing.

SUMMARY OF INVENTION

The present invention provides a technique required to smoothly execute a network service that provides contents while assuring high security.

According to the first aspect of the present invention, a management apparatus comprising: management means for managing, when a plurality of user terminals request a plurality of contents, the numbers of user terminals which request the content; decision means for deciding, for each of the plurality of contents, the number of content servers which provide that content using the numbers managed by the management means; and control means for installing, for each of the plurality of contents, that content in content servers as many as the number decided by the decision means in association with that content, and permitting user terminals which request the content to access the content servers which provide the content.

According to the second aspect of the present invention, a control method of a management apparatus, comprising: a management step of managing, when a plurality of user terminals request a plurality of contents, the numbers of user terminals which request the content; a decision step of deciding, for each of the plurality of contents, the number of content servers which provide that content using the numbers managed in the management step; and a control step of installing, for each of the plurality of contents, that content in content servers as many as the number decided in the decision step in association with that content, and permitting user terminals which request the content to access the content servers which provide the content.

Further features of the present invention will become apparent from the following description of exemplary embodiments with reference to the attached drawings.

BRIEF DESCRIPTION OF THE DRAWINGS

FIG. 4 is a table showing table information of the numbers of user terminals which request identical contents; and FIG. 5 is a table showing table information of processing loads of respective contents.

DESCRIPTION OF THE EMBODIMENTS

Embodiments of the present invention will be described hereinafter with reference to the accompanying drawings.

[First Embodiment]

Figure 1:
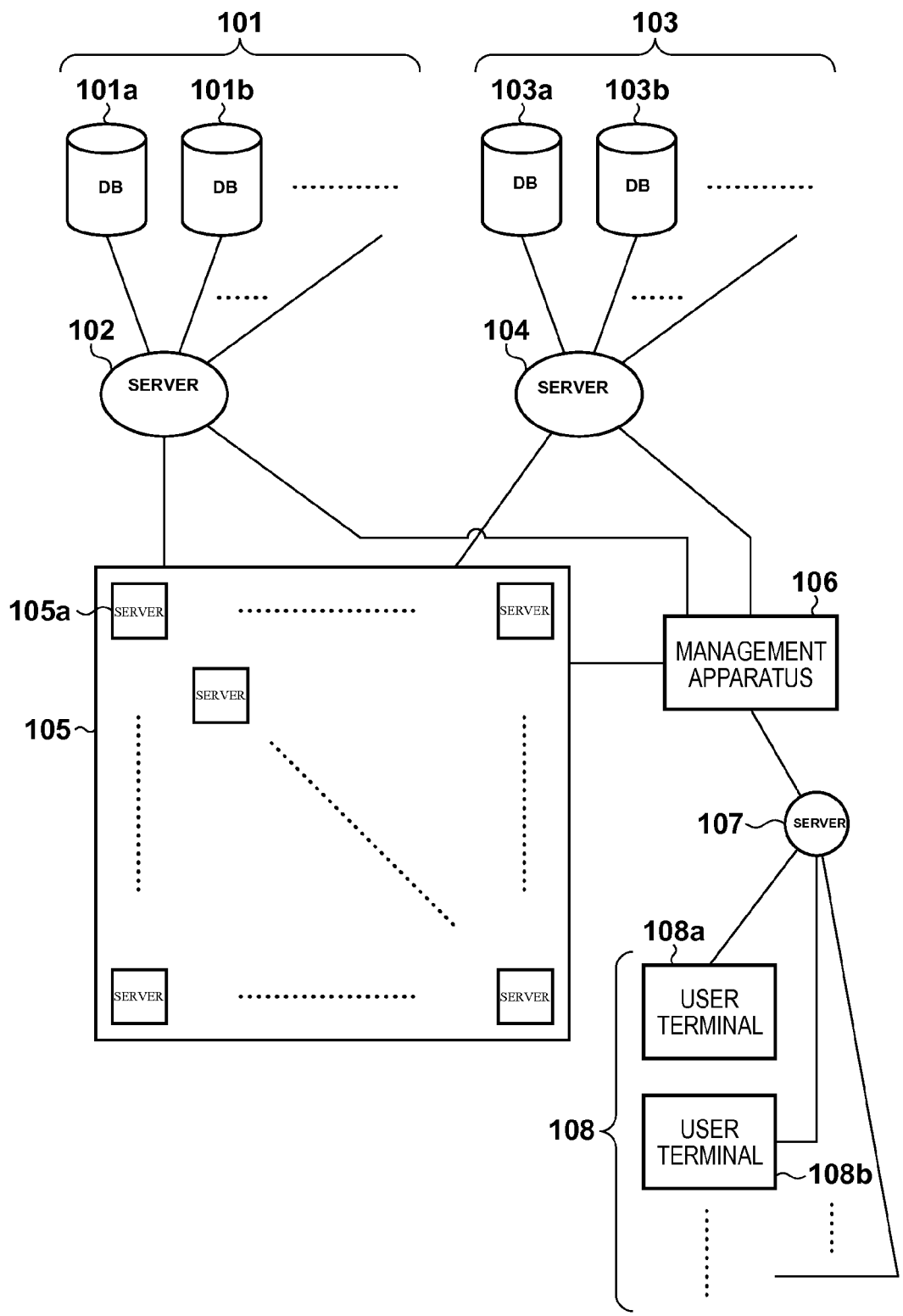
FIG. 1 is a block diagram showing an example of the arrangement of a system.

An example of the arrangement of a system according to this embodiment will be described first with reference to FIG. 1. Note that the numbers of apparatuses, network configurations between apparatuses, and the like shown in FIG. 1 are an example, and such configurations can be changed/modified as needed by those who are skilled in the art.

A personal information DB (database) 101 includes a plurality of personal information DBs including personal information DBs 101a and 101b, and pieces of personal information such as IP addresses, user names, passwords, and the like of user terminals 108 are registered in each individual personal information DB. For example, in the personal information DB 101a, pieces of personal information required to view contents provided by a company A are registered. Also, for example, in the personal information DB 101b, pieces of personal information required to view contents provided by a company B are registered. Pieces of personal information are registered from user terminals such as user terminals 108a and 108b.

A content DB 103 includes a plurality of content DBs including content DBs 103a and 103b. In respective content DBs, contents such as games and moving images are registered. For example, in the content DB 103a, contents (computer programs and data) provided by the company A are registered. Also, in the content DB 103b, contents (computer programs and data) provided by the company B are registered.

A content pool 105 includes a plurality of content servers 105a. Each individual content server 105a is connected to the personal information DB 101 via a proxy server 102 and also to the content DB 103 via a proxy server 104. Also, each individual content server 105a is connected to a management apparatus (center sever) 106.

To the management apparatus 106, the personal information DB 101 is connected via the proxy server 102, the content DB 103 is connected via the proxy server 104, and the user terminals 108 are connected via a proxy server 107.

An example of the hardware arrangement of the management apparatus 106 will be described below with reference to the block diagram shown in FIG. 2.

A CPU 201 executes operation control of the overall management apparatus 106 using computer programs and data stored in a RAM 202 and ROM 203, and executes respective processes which will be described later as those to be implemented by the management apparatus 106.

The RAM 202 has an area used to temporarily store computer programs and data loaded from an external storage device 206, data externally received via an I/F (interface) 207, and the like. Furthermore, the RAM 202 has a work area used when the CPU 201 executes various processes. That is, the RAM 202 can provide various areas as needed.

The ROM 203 stores setting data, a boot program, and the like of the management apparatus 106.

An operation unit 204 includes a mouse, keyboard, and the like, and can input various instructions to the CPU 201 when it is operated by the user.

A display unit 205 includes a CRT, liquid crystal panel, or the like, and can display the processing result of the CPU 201 by images and characters. Note that an arrangement used to make an audio output may be added to the display unit 205 or may be arranged independently of the display unit 205.

The external storage device 206 is a large-capacity information storage device represented by a hard disk drive. The external storage device 206 saves an OS (Operating System), and computer programs and data required to control the CPU 201 to execute respective processes which will be described later as those to be implemented by the management apparatus 106. Also, the external storage device 206 saves data that is used as given data by the management apparatus 106. The computer programs and data saved in the external storage device 206 are loaded as needed onto the RAM 202 under the control of the CPU 201, and are to be processed by the CPU 201.

To the I/F 207, the proxy servers 102, 104, and 107, and the respective content servers 105a are connected. To a bus 208, the aforementioned respective units are connected.

Figure 2:
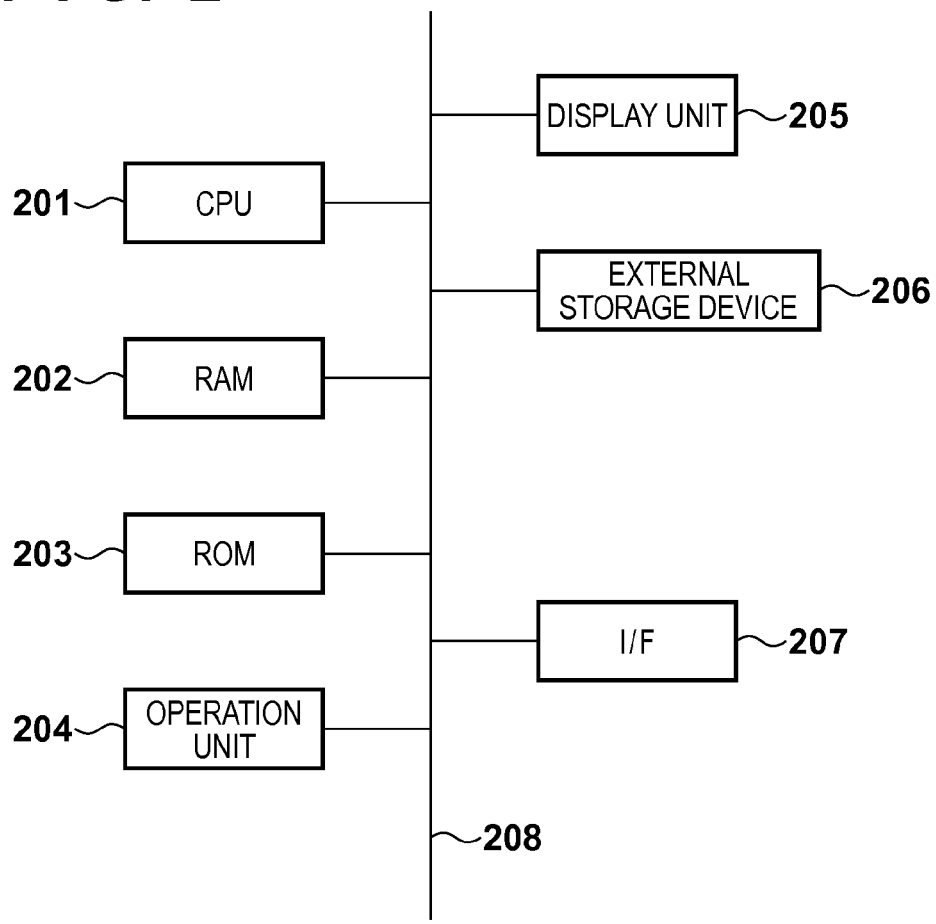
FIG. 2 is a block diagram showing an example of the hardware arrangement of a management apparatus 106.

Note that the arrangement shown in FIG. 2 may also be applied to the proxy servers 102, 104, and 107, content servers 105a, and user terminals 108. However, the arrangement of each of the proxy servers 102, 104, and 107, content servers 105a, and user terminals 108 is not limited to that shown in FIG. 2, and any other arrangements may be adopted as long as functions of the respective apparatuses can be implemented.

The operation of the management apparatus 106 will be described below.

The user of each individual user terminal can send a request of a content he or she wants to view using that user terminal. Upon reception of the request from the user terminal having an access right to the management apparatus 106, the proxy server 107 transfers this request to the management apparatus 106.

On the other hand, the management apparatus 106 manages operating states of the respective content servers 105a. That is, the management apparatus 106 manages content servers 105a which provide (do not provide) contents, and contents themselves to be provided. With this management, the management apparatus 106 manages, for each of contents currently provided by the content pool 105, the number of content servers 105a providing that content.

The management apparatus 106 tallies requests received via the proxy server 107, and manages, for each of contents, the number of user terminals requesting that content. For example, the management apparatus 106 manages, for each of contents, the number of user terminals requesting that content as table information exemplified in FIG. 4 in the external storage device 206.

As shown in the example of FIG. 4, the management apparatus 106 receives requests of content A, content B, and content C from the user terminals 108, the number of user terminals which request content A is 50, the number of user terminals which request content B is 80, and the number of user terminals which request content C is 10. This table information is rewritten as needed every time a request is received.

Figure 3:
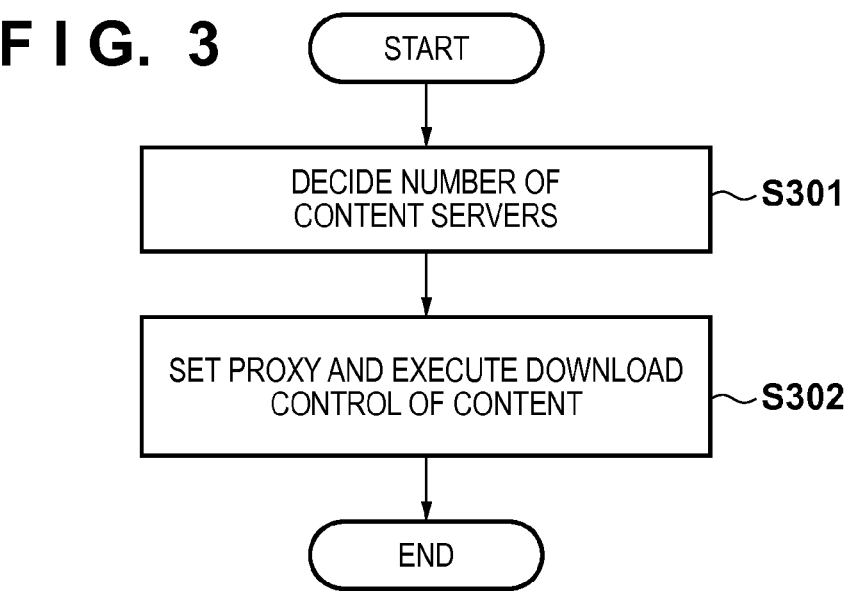
FIG. 3 is a flowchart of processing executed by the management apparatus 106.

Then, the management apparatus 106 executes processing according to the flowchart shown in FIG. 3 periodically or irregularly. Note that a computer program and data required to control the CPU 201 to execute processes of respective steps of the flowchart shown in FIG. 3 are saved in the external storage device 206. Thus, the CPU 201 loads this computer program and data onto the RAM 202, and executes processing using the loaded computer program and data, thus implementing the processes of the respective steps of the flowchart shown in FIG. 3.

In step S301, for each of contents requested from the user terminals 108, the number of content servers 105a providing that content is decided. Details of the process in step S301 will be described below. Various methods of deciding the numbers of servers in step S301 are available, and two examples of this method will be explained below.

Initially, for each of contents requested from the user terminals 108, a ratio of the number of user terminals requesting that content to the total number of user terminals is calculated, and the number according to the ratio of the total number of content servers is decided as the number of content servers which provide that content.

For example, in case of FIG. 4, assuming that the total number of content servers 105a is 100, the number XA of content servers 105a which provide content A is determined to be 35 by calculating:

$$XA=50/(50+80+10)\times 100=35.71\ldots \approx 35$$

Likewise, the number XB of content servers 105a which provide content B and the number XC of content servers 105a which provide content C are respectively decided to be 57 and 7 by calculating:

$$XB=80/(50+80+10)\times 100=57.14\ldots \approx 57$$

$$XC=10/(50+80+10)\times 100=7.14\ldots \approx 7$$

When table information, which stores processing loads of respective contents, as exemplified in FIG. 5, is registered in the external storage device 206 in addition to the table information shown in FIG. 4, the numbers XA, XB, and XC may be calculated as follows. As shown in FIG. 5, a load on processing required for the content server 105a to provide content A is 50, that on processing required for the content server 105a to provide content B is 10, and that on processing required for the content server 105a to provide content C is 60.

Note that the load on processing is defined to have a maximum load=100 in a single server. Therefore, the load on processing in a single server never exceeds this maximum load, as a matter of course.

In this case, assuming that the total number of content servers 105a is 100, the numbers XA, XB, and XC can be calculated as follows.

Initially, for each of contents requested from the user terminals, a product of the number of user terminals which request that content, and a processing load of that content is calculated, and a value S is calculated by dividing a sum of products calculated for a plurality of contents by the maximum load using:

$$S=(50\times 50+80\times 10+10\times 60)/100=39$$

This value S is the sum total of the numbers XA, XB, and XC. Therefore, the number of servers to be assigned to the number XA of the S servers, that to be assigned to the number XB of the S servers, and that to be assigned to the number XC of the S servers are decided. In this case, since S=39, the number of servers to be assigned to the number XA of the 39 servers, that to be assigned to the number XB of the 39 servers, and that to be assigned to the number XC of the 39 servers are decided. For example, the numbers of servers to be assigned are decided as follows:

$$XA=50/(50+80+10)\times 39=13.92\ldots \approx 13$$

$$XB=80/(50+80+10)\times 39=33.28\ldots \approx 22$$

$$XC=10/(50+80+10)\times 39=2.78\ldots \approx 2$$

Note that when the value S assumes a real number having a decimal part like 39.2, it is rounded up to 40, so that 39 servers are used at 100% (processing load), and one server is used at 20%. In the above example, the value S is calculated by dividing the sum total by 100. In this case, the sum total may be divided by 80 to reduce a load per server although the number of servers to be used increases.

That is, for each of a plurality of contents, various methods of calculating a product of the number of user terminals which request that content and the processing load of that content, and calculating the number of content servers which provide, for each of the plurality of contents, that content based on the sum of products calculated for the plurality of contents are available.

Note that this embodiment has explained the two examples using use statuses for respective resources as the method of calculating the number of content servers 105a which provide each content. However, other methods may be used, and this embodiment is not limited to specific methods.

Also, the user may be allowed to select one of a plurality of methods including the aforementioned two methods using the operation unit 204. In this case, in step S301, for each of contents, the number of content servers 105a which provide that content is calculated according to the selected method.

Next, in step S302, the following processing is executed for respective contents requested from the user terminals 108. In this case, assume that contents requested from the user terminals 108 are content A, content B, and content C for the sake of simplicity.

In this case, in step S302, the content server 105a as many as the number XA decided in step S301 in association with content A are selected from the content pool 105. How to select the content servers 105a as many as the number decided in step S301 is not particularly limited to a specific method. For example, when IDs=1, 2, 3, . . . are assigned to the content servers 105a, the content servers 105a with IDs=1 to XA may be selected.

Then, the settings of the proxy servers 102 and 104 are changed to allow the selected content servers 105a to access the personal information DB which holds pieces of personal information associated with content A, and the content DB which holds content A. Since such setting technique of the proxy server is a known technique, a description thereof will not be given.

In this way, only the content servers 105a which are selected as those which provide content A are allowed to access the personal information DB which holds pieces of personal information associated with content A, and the content DB which holds content A. Such processing is similarly executed for content B and content C.

Then, the content servers 105a which are selected as those which provide content A are controlled to download content A from the content DB which holds the content A. In this case, downloading to the content servers 105a to which content A has already been download is skipped. The content servers 105a, which provided a content other than content A (one of content B and content C), are controlled to delete contents currently provided, and then to download content A from the content DB which holds content A. In this way, content A can be installed in the content servers 105a which are selected as those which provide content A. Such processing is similarly executed for content B and content C.

Note that the content servers which are not selected in step S302 include those which provided contents so far. For example, when a content server which provided content C before selection in step S302 is changed to a content server which does not provide any content as a result of selection in step S302, content C is deleted from this content server.

In step S302, the proxy server 107 is set to allow the user terminals which requested content A to access the content servers 105a which are selected as those which provide content A. The same applies to content B and content C.

Upon completion of the aforementioned processing, a user terminal which requests content X (user terminal X) can access the content server 105a which provides content X (content server X), and the content server X can access the personal information DB which holds pieces of personal information for content X, and the content DB which holds content X. Hence, the content server X can provide content X while using the personal information DB which holds pieces of personal information for content X, and the content DB which holds content X, and the user terminal X can view content X provided by this content server X.

After the processing according to the flowchart shown in FIG. 3, the contents providing timing of each content server is not particularly limited to a specific timing.

[Second Embodiment]

In the first embodiment, the access right control is executed using the proxy servers. Alternatively, the access right control may be executed without using any proxy server. For example, an apparatus which controls the access right to be granted may be used in place of the proxy server. As for such access right control technique, various techniques are conventionally known, and any of these techniques can be used.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefits of U.S. Patent Provisional Application No. 61/556,425, filed Nov. 7, 2011, and Japanese Patent Application No. 2012-014539 filed Jan. 26, 2012, which are hereby incorporated by reference herein in their entirety.

The invention claimed is:

1. A management apparatus, comprising:
a processor; and
a memory storing instructions that, when executed by the processor, cause the processor to perform operations including:
   managing, when a plurality of user terminals request a plurality of contents, numbers of user terminals which request the plurality of contents;
   deciding, for each content of the plurality of contents, a number of content servers which provide the content using the numbers managed by the processor; and
   installing, for each content of the plurality of contents, the content in content servers as many as the number decided by the processor in association with the content, and permitting user terminals which request the content to access the content servers which provide the content,
wherein the processor calculates, for each content of the plurality of contents, a product of the number of user terminals which request the content and a processing load of the content, and
the processor calculates, for each content of the plurality of contents, the number of content servers which provide the content from a sum of the products respectively calculated for the plurality of contents.

2. The management apparatus according to claim 1, wherein the processor calculates, for each content of the plurality of contents, a ratio of the number of user terminals which request the content to a total number of user terminals, and decides the number of content servers which provide the content according to the ratio.

3. The management apparatus according to claim 1, wherein the processor sets, for each content of the plurality of contents, a proxy server which mediates between a database which holds the content and content servers as many as the number decided by the processor for the content to allow a communication between the database and the content servers, and the processor downloads the content from the database which holds the content to the content servers as many as the number decided by the processor for the content after the setting.

4. The management apparatus according to claim 1, wherein the processor deletes contents installed in content servers other than the content servers as many as the number decided by the processor for each of the plurality of contents.

5. The management apparatus according to claim 1, wherein the processor calculates, for each content of the plurality of contents, the number of content servers which provide the content by multiplying the sum of the products respectively calculated for the plurality of contents and a ratio of the number of user terminals requesting the content to a total number of user terminals.

6. The management apparatus according to claim 1, wherein the processor determines a number of content servers which provide the contents by dividing the sum of the products respectively calculated for the plurality of contents by a total number of content servers.

7. The management apparatus according to claim 6, wherein the processor calculates, for each content of the plurality of contents, the number of content servers which provide the content by multiplying the number of content servers which provide the contents and a ratio of the number of user terminals requesting the content to a total number of user terminals.

8. A control method of a management apparatus, comprising:

managing, by a processor and when a plurality of user terminals request a plurality of contents, numbers of user terminals which request the content;

deciding, by the processor and for each content of the plurality of contents, a number of content servers which provide the content using the numbers managed by the processor; and installing, by the processor and for each content of the plurality of contents, the content in content servers as many as the number decided by the processor in association with the content, and permitting user terminals which request the content to access the content servers which provide the content, wherein the processor calculates, for each content of the plurality of contents, a product of the number of user terminals which request the content and a processing load of the content, and the processor calculates, for each content of the plurality of contents, the number of content servers which provide the content from a sum of the products respectively calculated for the plurality of contents.

9. The control method according to claim 8, further comprising: calculating, by the processor and for each content of the plurality of contents, the number of content servers which provide the content by multiplying the sum of the products respectively calculated for the plurality of contents and a ratio of the number of user terminals requesting the content to a total number of user terminals.

10. The control method according to claim 8, further comprising: determining, by the processor, a number of content servers which provide the contents by dividing the sum of the products respectively calculated for the plurality of contents by a total number of content servers.

11. The control method according to claim 10, further comprising:

calculating, by the processor and for each content of the plurality of contents, the number of content servers which provide the content by multiplying the number of content servers which provide the contents and a ratio of the number of user terminals requesting the content to a total number of user terminals.

12. A non-transitory computer-readable storage medium storing a computer program for controlling a computer to function as a management apparatus that, when executed by the computer, causes the computer to perform operations including:

managing, when a plurality of user terminals request a plurality of contents, numbers of user terminals which request the content;

deciding, for each content of the plurality of contents, a number of content servers which provide the content using the numbers managed by the processor; and installing, for each content of the plurality of contents, the content in content servers as many as the number decided by the processor in association with the content, and permitting user terminals which request the content to access the content servers which provide the content, wherein the computer calculates, for each content of the plurality of contents, a product of the number of user terminals which request the content and a processing load of the content, and the computer calculates, for each content of the plurality of contents, the number of content servers which provide the content from a sum of the products respectively calculated for the plurality of contents.

13. The non-transitory computer-readable storage medium according to claim 12, wherein the operations further comprise:

calculating, for each content of the plurality of contents, the number of content servers which provide the content by multiplying the sum of the products respectively calculated for the plurality of contents and a ratio of the number of user terminals requesting the content to a total number of user terminals.

14. The non-transitory computer-readable storage medium according to claim 12, wherein the operations further comprise:

determining a number of content servers which provide the contents by dividing the sum of the products respectively calculated for the plurality of contents by a total number of content servers.

15. The non-transitory computer-readable storage medium according to claim 14, wherein the operations further comprise:

calculating, for each content of the plurality of contents, the number of content servers which provide the content by multiplying the number of content servers which provide the contents and a ratio of the number of user terminals requesting the content to a total number of user terminals.

* * * * *